Figure 2:
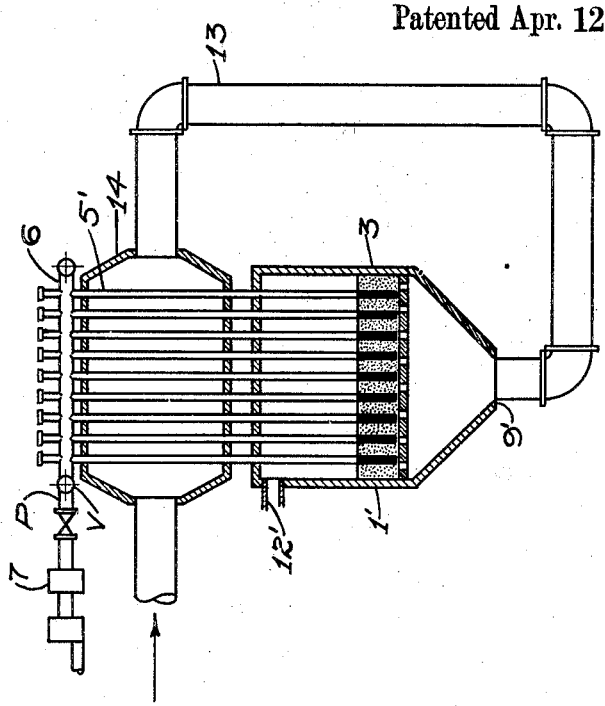

C. R. DOWNS.
PROCESS OF PRODUCING MALEIC ACID.
APPLICATION FILED JULY 3, 1920.

1,374,720.

Patented Apr. 12, 1921.

INVENTOR
Charles R. Downs
BY
Chas. W. Mortimer
ATTORNEY

UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

PROCESS OF PRODUCING MALEIC ACID.

1,374,720.  Specification of Letters Patent.  Patented Apr. 12, 1921.

Original application filed June 11, 1919, Serial No. 303,337. Divided and this application filed July 3, 1920. Serial No. 393,904.

*To all whom it may concern:*

Be it known that I, CHARLES R. DOWNS, a citizen of the United States, residing at Cliffside, in the county of Bergen and State of New Jersey, have invented certain new and useful Improvements in Processes of Producing Maleic Acid, of which the following is a specification.

This invention is for a process of producing maleic acid from benzene. By this invention use is made of the principle that vaporizable liquids will absorb latent heat in changing from the liquid to the vapor state without change in temperature, the heat being carried away by the vapors, from which it may be extracted, thereby condensing the vapors which may be returned for absorbing more heat. This is a division of my application Ser. No. 303,337 filed June 11, 1919.

The invention will be described and illustrated in connection with apparatus in which a gaseous reaction mixture is brought into contact with a catalyst in which or in proximity to which there are containers for a vaporizable liquid or liquids, said containers being provided with means for leading off vapors to a cooling space and returning the condensed liquid. There may be one or more containers for the liquid and they should be so shaped and disposed that heat will be readily transmitted from the catalyst to the vaporizable liquid. It is to be understood that the invention is not restricted to the particular apparatus shown, nor to the materials mentioned.

In the drawings—

Figure 1:
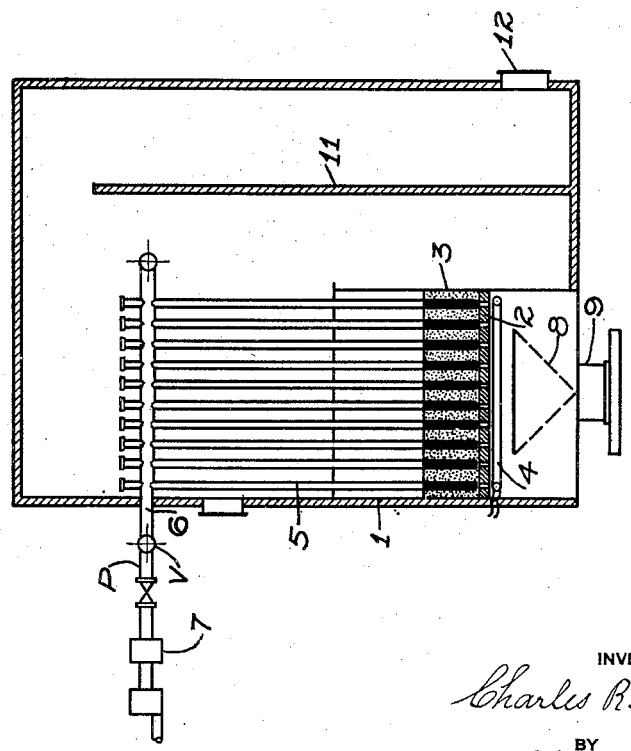

Figure 1 is a section through a form of apparatus for carrying out the process, and Fig. 2 is a section through a modified form of the apparatus.

In Fig. 1 the reference character 1 refers to a container which is provided with a perforated plate 2 upon which a layer of catalyst 3 or carrier such as pumice or asbestos for said catalyst, is placed. Electrical heating means are shown at 4 and a series of pipes 5 with closed ends extend into the catalyst 3 or the carrier for the same. The upper ends of the pipes 5 terminate in a header 6 which may be connected to a pump 7 which may be used either to create a vacuum or pressure in the pipe or to introduce a gas, preferably neutral, into the header from a source, not shown. A valve V in the pipe P may be closed, if desired, after the pump 7 has been operated to obtain the desired condition in the system. The lower ends of the pipes 5 are filled with a liquid which may be vaporized and then be condensed in the upper end of the tubes 5 and run back into the lower ends. A deflector 8 is shown in the lower part of the container 1 which has an inlet 9 and the container 1 is surrounded by a casing or housing 10 having a partition 11 and an outlet 12.

In the modification shown in Fig. 2, the container $1^1$ is provided with an outlet $12^1$, and a pipe 13 leads to the inlet $9^1$ from the jacket 14 which surrounds the upper portion of the tubes $5^1$. The other parts shown in Fig. 2 are similar to the corresponding parts described in connection with Fig. 1.

The operation according to Fig. 1 is as follows: The reaction mixture is introduced through inlet 1 into container 1 where it comes into contact with the catalyst 3. If necessary, the heater 4 may first bring the temperature up to that required to initiate the catalytic reaction which is an exothermic one. The catalyst 3 becomes heated and the heat is conducted through the walls of the tubes 5 to the liquid therein which is caused to boil and the vapors rise in the tubes 5, the upper ends of which are cooled in any convenient way so that the vapors become condensed and trickle back into the lower ends of the tubes 5. The liquid in the tubes is not heated above its boiling point because an increase in the heat transmitted to the same merely causes an increase in the ebullition without a rise in temperature. The pressure in the system may be increased or diminished by means of the pump 7 thereby varying the temperature at which the liquid will boil. After the reaction mixture has passed through the catalytic zone, the products of reaction pass upward around the wall 11 and out of the outlet 12, so that the products may be collected and used. The operation according to Fig. 2 is the same as that above described in connection with Fig. 1 except that the reaction mixture is passed through jacket 14 so as to come into contact with the catalyst $3^1$. The products of reaction pass out through the outlet $12^1$.

A specific application of this invention is in the oxidation of benzene to maleic acid in the presence of vanadium oxid as a catalyzer. It has been found that the proper temperature at which this reaction should be carried out is about 400° C. because very much higher temperatures cause the oxidation to progress too far, and the reaction will not take place satisfactorily at very much lower temperatures. Mercury boils at 357° C. and if proper pressure is applied upon the mercury its boiling point is changed sufficiently so that if a mixture of an oxygen containing gas and benzene in the vapor phase is passed into the catalyst the exothermic reaction to produce maleic acid will raise the temperature enough to provide sufficient temperature gradient or head between the catalyst 3 and the liquid in tubes 5 when this liquid is mercury so that the exothermic heat is transmitted from the catalyst to the mercury with sufficient rapidity to keep the temperature of the catalyst at about the proper point, or near 400° C. The temperature will be automatically regulated to a certain extent, for when more heat is evolved the mercury will boil more rapidly and thereby remove heat more rapidly. The cooling surfaces of the pipes 5 will be made large enough to assure condensing of all the vapors, and the pressure maintained in the pipes will be such as to keep the boiling point of the liquid mercury so that it will hold the catalyst at the proper temperature. When mercury or other oxidizable liquid is used as the heat removing agency it may be advisable to introduce into the tubes 5 a neutral gas, such as nitrogen, to prevent oxidation of the liquid.

It is obvious that the principle of this invention may be applied in different ways without departing from the spirit and scope of the invention, and the temperature may be controlled in many other chemical reactions by using other liquids of different boiling points or the boiling points of the liquids used can be controlled within somewhat wide limits by changing the pressure inside the tubes 5. Two or more streams of liquids or gases, or a mixture of the same with solid materials, which react exothermically when brought into contact may have their temperatures controlled during the reaction as herein described. Further examples of chemical reaction to which this invention is applicable are the oxidation of anthracene to anthraquinon, toluene to benzoic acid and benzaldehyde, naphthalene to phthalic anhydrid, ethyl alcohol to acetaldehyde, and the chlorination of hydrocarbons, etc. Other applications of this invention not necessary to describe will readily occur to those skilled in the art.

I claim:

1. In the manufacture of maleic acid by the partial oxidation of benzene by an oxygen containing gas in the presence of a suitable catalyzer, the step which comprises providing liquid mercury out of contact with the reaction mixture but in heat transferring relationship thereto.

2. In the manufacture of maleic acid by the partial oxidation of benzene by an oxygen containing gas in the presence of a suitable catalyst, the steps which comprise supplying liquid mercury to the zone of reaction out of contact with the reaction mixture but in heat transferring relationship to said catalyst so that heat will be absorbed by said mercury as latent heat of vaporization and maintaining the supply of liquid mercury in the reaction zone by introducing liquid mercury before all of the original mercury has been vaporized.

3. In the art of gas phase oxidation of benzene in the presence of a catalyst to form maleic acid, the improvement which comprises maintaining a substantially constant and uniform temperature by the vaporization of a liquid distributed within the zone of reaction out of direct contact with the catalyst but in heat transferring relationship thereto.

4. In the art of gas phase oxidation of benzene in the presence of a catalyst to form maleic acid, the improvement which comprises maintaining a substantially constant and uniform temperature by the vaporization of mercury distributed within the zone of reaction out of direct contact with the catalyst but in heat transferring relationship thereto.

In testimony whereof I affix my signature.

CHARLES R. DOWNS.